United States Patent
Hulick, Jr.

(10) Patent No.: US 9,052,980 B2
(45) Date of Patent: Jun. 9, 2015

(54) EXCEPTION BASED QUALITY ASSESSMENT

(71) Applicant: Walter T. Hulick, Jr., Pearland, TX (US)

(72) Inventor: Walter T. Hulick, Jr., Pearland, TX (US)

(73) Assignee: BMC SOFTWARE, INC., Houston, TX (US)

( * ) Notice: Subject to any disclaimer, the term of this patent is extended or adjusted under 35 U.S.C. 154(b) by 115 days.

(21) Appl. No.: 13/772,040

(22) Filed: Feb. 20, 2013

(65) Prior Publication Data

US 2014/0237453 A1   Aug. 21, 2014

(51) Int. Cl.
G06F 9/44 (2006.01)

(52) U.S. Cl.
CPC .......................................... G06F 8/70 (2013.01)

(58) Field of Classification Search
None
See application file for complete search history.

(56) References Cited

U.S. PATENT DOCUMENTS

| | | | | |
|---|---|---|---|---|
| 6,247,169 | B1 * | 6/2001 | DeLong | 717/131 |
| 6,327,699 | B1 * | 12/2001 | Larus et al. | 717/128 |
| 6,662,359 | B1 * | 12/2003 | Berry et al. | 717/130 |
| 7,661,094 | B2 * | 2/2010 | Blevin et al. | 717/130 |
| 7,958,497 | B1 * | 6/2011 | Lindo et al. | 717/128 |
| 8,146,057 | B1 * | 3/2012 | Michelsen | 717/124 |
| 8,495,581 | B2 * | 7/2013 | Choppakatla et al. | 717/126 |
| 8,561,021 | B2 * | 10/2013 | Muharsky et al. | 717/113 |
| 2006/0101420 | A1 * | 5/2006 | Shinnar et al. | 717/130 |
| 2009/0199161 | A1 * | 8/2009 | Cutler | 717/124 |
| 2011/0022551 | A1 * | 1/2011 | Dixon | 706/12 |
| 2011/0055640 | A1 * | 3/2011 | Huang et al. | 714/49 |
| 2011/0066908 | A1 * | 3/2011 | Bartz et al. | 714/746 |
| 2011/0107307 | A1 * | 5/2011 | Liu et al. | 717/125 |
| 2011/0197176 | A1 * | 8/2011 | Muharsky et al. | 717/113 |
| 2011/0252394 | A1 * | 10/2011 | Sharma et al. | 717/101 |
| 2012/0167054 | A1 * | 6/2012 | Liu et al. | 717/125 |
| 2012/0284697 | A1 * | 11/2012 | Choppakatla et al. | 717/127 |

OTHER PUBLICATIONS

Vo, Kiem-Phong et al., Xept: A Software Instrumentation Method for Exception Handling, 1997, pp. 1-10.*
Zhang, Pingyu et al., Amplifying Tests to Validate Exception Handling Code, 2012, pp. 595-605.*
Li, Xin et al., Towards Automatic Exception Safety Verification, 2006, pp. 396-411.*
Sinha, Saurabh et al., Fault Localization and Repair for Java Runtime Exceptions, 2009, pp. 153-163.*
Patino-Martinez, Marta et al., Exception Handling and Resolution for Transactional Object Groups, 2001, pp. 165-180.*

(Continued)

*Primary Examiner* — Thuy Dao
*Assistant Examiner* — Christopher Franco
(74) *Attorney, Agent, or Firm* — Brake Hughes Bellermann LLP

(57) ABSTRACT

The embodiments may include an apparatus for measuring code quality using exceptions. The apparatus may include a runtime collector configured to intercept exceptions generated by an application, and collect exception information for each exception, during runtime of the application, based on instrumentation code included within the application. The apparatus may include a collection module configured to store the intercepted exceptions and corresponding exception information in a memory unit, an exception analyzer configured to analyze the intercepted exceptions based on the collected exception information stored in the memory unit, and a report generator configured to generate at least one report based on the analysis. The at least one report may provide an indication of code quality of the application.

19 Claims, 4 Drawing Sheets

(56) References Cited

OTHER PUBLICATIONS

Thummalapenta, Suresh et al., Mining Exception-Handling Rules as Sequence Association Rules, 2009, pp. 496-506.*

"10 best practices with Exceptions", WikiJava Article, www.wikijava.org/wiki/10_best_practices_with_Exceptions, Date of Access: Jan. 18, 2013, 6 pages.

"Class Exception", Java Platform SE 7, docs.oracle.com/javase/7/docs/api/java/lang/Exception.html, 1993, 4 pages.

"Exception handling", Wikipedia Article, en.wikipedia.org/wiki/Exception_handling, Jan. 17, 2013, 13 pages.

"Java—Exceptions Handling", www.tutorialspoint.com/java/java_exceptions.htm, Date of Access: Jan. 25, 2013, 8 pages.

"Class Throwable", Java 2 Platform SE 5.0, docs.oracle.com/javase/1.5.0/docs/api/java/lang/Throwable.html, 2004, 11 pages.

"What is an Exception?", The Java Tutorials > Essential Classes > Exceptions, docs.oracle.com/javase/tutorial/essential/exceptions/definition.html, 1995, 2 pages.

"What is Java bytecode injection?", Stack Overflow, stackoverflow.com/questions/3470949/what-is-java-bytecode-injecfion, Date of Access: Jan. 18, 2013, 2 pages.

International Search Report and Written Opinion for International Application No. PCT/US2014/014155, mailed Jul. 9, 2014, 9 pages.

\* cited by examiner

Exception Type Report 146

| Exception Type 302 | Unique Locations 304 | Times Thrown 306 | First Time 308 | Last Time 310 | Last Class 312 | Last Method 314 | Last File 316 | Last Uncaught 318 | Last Message 320 | Last Stack Trace 322 |
|---|---|---|---|---|---|---|---|---|---|---|
| First Exception type (java.lang.RuntimeException) 302-1 | 1 | 3 | Wed Dec 19 14:56:54 CST 2012 | Wed Dec 31 18:00:00 CST 1969 | Sample | SampleRuntime | Sample.java:67 | False | Bad runtime Exception... | java.lang.Runtime.Exception: Bad Runtime exception...at Sample.exceptionRoutine (Sample.java:67) at SampleS1.run (Sample.java:60) |
| Second Exception Type (java.lang.NullPointerException) 302-2 | 1 | 3 | Wed Dec 19 14:56:54 CST 2012 | Wed Dec 31 18:00:00 CST 1969 | Sample | SampleInt2 | Sample.java:56 | False | null | Java.lang.NullPointerException at Java.File.(File,java:222) at Sample.SampleInt2(Sample.java:56)at Sample.sampleInt1(Sample.java:49)at Sample.entryPoint(Sample.java:29)at Sample.main(Sampe.java:13) |

FIG.3

Exception Location Report 148

| Class 402 | Method 404 | File 406 | Uncaught 408 | Exception Name 410 | Times Thrown 412 | First Time 414 | Last Time 416 | Message 418 | Stack Trace 420 |
|---|---|---|---|---|---|---|---|---|---|
| Sample | exceptionRoutine | Sample.java:67 | false | java.lang.RuntimeException | 18 | Wed Dec 19 14:56:54 CST 2012 | Wed Dec 19 14:56:54 CST 2012 | Bad runtime exception... | java.lang.RuntimeException:Bad Runtime exception...at Sample.exceptionRoutine (Sample.java:67) at SampleS1.run (Sample.java:60) |
| Sample | sampleInt2 | Sample.java:56 | false | java.lang.NullPointerException | 18 | Wed Dec 19 14:56:54 CST 2012 | Wed Dec 19 14:56:54 CST 2012 | null | java.lang.NullPointerException at java.io.File. (File.java:222) at Sample.sampleInt2 (Sample.java:56) at Sample.sampleInt1 (Sample.java:49) at Sample.entryPoint (Sample.java:29) at Sample.main (Sample.java:13) |

FIG.4

EXCEPTION BASED QUALITY ASSESSMENT

TECHNICAL FIELD

The present disclosure relates generally to measuring code quality using exceptions.

BACKGROUND

Application stakeholders, quality assurance personnel, and customers that outsource software development are constantly searching for accurate tools that measure code quality and liability during an application's runtime period. Often times, problems are hidden or suppressed in the binaries of the code and are not reported in the logs. In addition, bad coding techniques and packaging may also contribute to problems in the source code. In addition, source code may be too cumbersome to perform a complete error check, or the source code is simply not available.

SUMMARY

The embodiments may include an apparatus for measuring code quality using exceptions. The apparatus may include at least one processor, and a non-transitory computer-readable storage medium including instructions executable by the at least one processor. The instructions may be configured to implement a runtime collector configured to intercept exceptions generated by an application, and collect exception information for each exception, during runtime of the application, based on instrumentation code included within the application. Each exception may represent a potential error that occurred during runtime of the application. Also, the instructions may be configured to implement a collection module configured to store the intercepted exceptions and corresponding exception information in a memory unit, an exception analyzer configured to analyze the intercepted exceptions based on the collected exception information stored in the memory unit, and a report generator configured to generate at least one report based on the analysis. The at least one report may provide an indication of code quality of the application.

The apparatus may further include an instrumentation engine configured to inject the instrumentation code within a base class associated with the exceptions such that constructors of the base class are monitored during runtime of the application. In one embodiment, the base class associated with the exceptions may include java.lang.throwable class.

The runtime collector may be further configured to monitor the constructors of the base class, and collect one or more arguments of a monitored constructor as the monitored constructor is called during the runtime of the application.

The exception information may include a fault line number indicating at least one code line that produced a corresponding exception, class information indicating a class that produced the corresponding exception, type information indicating a type of the corresponding exception, a stack trace of the application that produced the corresponding exception, a cause of the corresponding exception, and/or a message associated with the corresponding exception.

The exception analyzer may include a categorizer configured to derive a type of each exception, and a location within the application that produced each exception based on the exception information, and the categorizer may be configured to categorize the intercepted exceptions according to the type and/or the location.

The exception analyzer may be further configured to derive an exception type count indicating a number of times a particular type of exception was generated, a class exception count indicating a number of times a particular class or method produced an exception, and/or a faulting location count indicating a number of times a particular location produced an exception, based on the exception information. The report generator may be further configured to generate the at least one report based on the exception type count, the class exception count, and/or the faulting location count.

The exception analyzer may include an application grader configured to generate a score value representing a quality of the application based on the exception information, and the at least one report may include the generated score value.

The application grader may be further configured to generate the score value based on a total number of exceptions, type of exceptions, number of uncaught exceptions, and/or number of unique locations that produced the exceptions. The at least one report may include the exceptions categorized by type of exception. The at least one report may include the exceptions categorized by location that produced the exceptions.

The embodiments may include a method for measuring code quality using exceptions. The method may include intercepting, by at least one processor, exceptions generated by an application, and collecting, by the at least one processor, exception information for each exception, during runtime of the application, based on instrumentation code included within the application. Each exception may represent a potential error that occurred during runtime of the application. The method may include storing, by the at least one processor, the intercepted exceptions and corresponding exception information in a memory unit, analyzing, by the at least one processor, the intercepted exceptions based on the collected exception information stored in the memory unit, and generating, by the at least one processor, at least one report based on the analysis. The at least one report may provide an indication of code quality of the application.

The method may further include injecting, by the at least one processor, the instrumentation code within a base class associated with the exceptions, monitoring, by the at least one processor, constructors of the base class, and collecting, by the at least one processor, one or more arguments of a monitored constructor as the monitored constructor is called during the runtime of the application.

The exception information may include a fault line number indicating at least one code line that produced a corresponding exception, class information indicating a class that produced the corresponding exception, type information indicating a type of the corresponding exception, a stack trace of the application that produced the corresponding exception, a cause of the corresponding exception, and/or a message associated with the corresponding exception.

The analyzing, by the at least one processor, the intercepted exceptions based on the collected exception information stored in the memory unit may include deriving a type of each exception, and a location within the application that produced each exception based on the exception information, and categorizing the intercepted exceptions according to at least one of the type and the location.

The embodiments may include a non-transitory computer-readable medium storing instructions that when executed cause at least one processor to measure code quality using exceptions. The instructions may include instructions to intercept exceptions generated by an application, and collect exception information for each exception, during runtime of the application, based on instrumentation code included within the application. Each exception may represent a potential error that occurred during runtime of the application. The instructions may include instructions to store the intercepted exceptions and corresponding exception information in a memory unit, analyze the intercepted exceptions based on the collected exception information stored in the memory unit, and generate at least one report based on the analysis. The at least one report may provide an indication of code quality of the application.

The instructions include instructions to inject the instrumentation code within a base class associated with the exceptions, monitor constructors of the base class, and collect one or more arguments of a monitored constructor as the monitored constructor is called during the runtime of the application.

The instructions to analyze the intercepted exceptions based on the collected exception information stored in the memory unit may include derive a type of each exception, and a location within the application that produced each exception based on the exception information, and categorize the intercepted exceptions according to at least one of the type and the location.

The instructions may include instructions to generate a score value representing a quality of the application based on the exception information, and the at least one report may include the generated score value. The instructions to generate a score value representing a quality of the application based on the exception information may include generating the score value based on at least one of a total number of exceptions, type of exceptions, number of uncaught exceptions, and number of unique locations that produced the exceptions.

BRIEF DESCRIPTION OF THE DRAWINGS

FIG. 3 illustrates an exception type report generated by the apparatus of FIG. 1 according to an embodiment; and FIG. 4 illustrates an exception location report generated by the apparatus of FIG. 1 according to an embodiment.

DESCRIPTION OF EXAMPLE EMBODIMENTS

Figure 1:
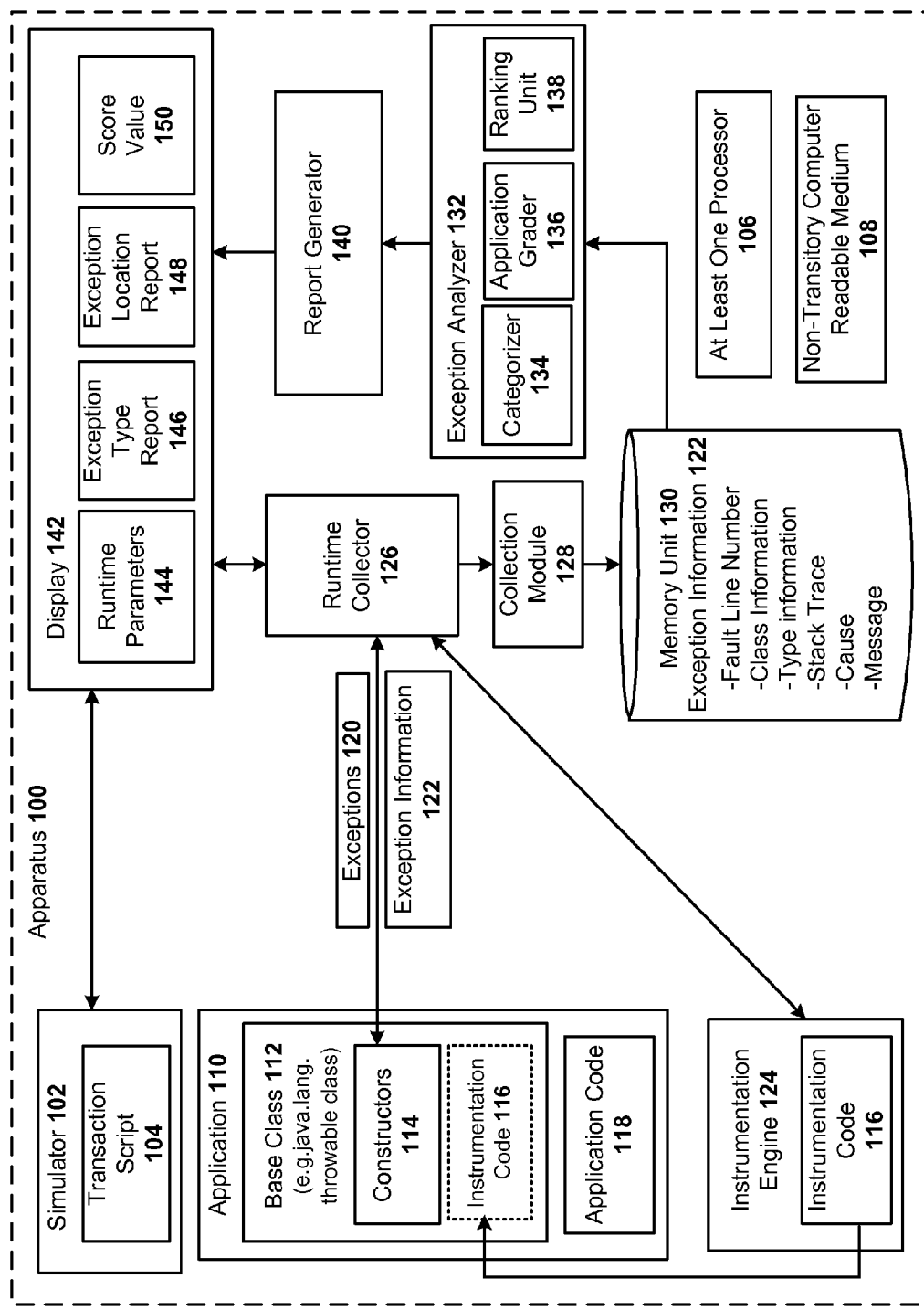
FIG. 1 illustrates an apparatus for measuring code quality using exceptions according to an embodiment.

The embodiments include an apparatus configured to measure code quality of an application using exceptions that are generated during runtime of the application. For example, the apparatus may monitor and log the number and severity of exceptions generated in an application. Each exception may represent a potential error in the application code of the application. For example, an exception may be a problem that arises during execution of the application such as the user entered invalid data, a file that needs to be opened cannot be found, or a network connection cannot be established.

According to the embodiments, the application may execute a transaction script that simulates typical transactions when the application is deployed in a runtime situation. Then, as the application is performing the transactions, the apparatus may collect exceptions that are generated during runtime of the application, as well as exception information for each generated exception. The exception information may include a fault line number indicating one or more code lines of the application that produced a corresponding exception, as well as the class, the type, the stack trace, the cause, and/or the message, of each exception.

In particular, the apparatus has the capabilities of catching and logging every exception that was generated during runtime of the application. Based on the collected exception information, a report may be generated that categorizes the exceptions in a manner that exposes the code quality of the application. For example, the report may indicate the total number of exceptions, the number of unique locations in the application code that produced the exceptions, as well as the number of exceptions that occurred within each type of exception. However, many different types of reports may be generated that expose the code quality of the underlying application using the collected exception information.

The total number of exceptions may indicate the disruptiveness of the exceptions in the application, e.g., if the application is constantly in an interrupt mode. Also, the seriousness of the exceptions may be exposed by identifying the types of exceptions and the number of exceptions included within each type. For example, some types of exceptions are more serious than other types, and the report may provide an indication of the number of serious exceptions contained in the application. Also, the report may provide whether there are any threads terminated by the exceptions, and whether the exceptions are produced in a location under control of the developer or in a location under the control of a third party.

Also, the apparatus may use exceptions to baseline between application versions or releases. For example, a report provided by the apparatus may indicate if the exception count is increasing or decreasing between one or more previous versions of the application and a current version of the application, whether there are new exception types and/or new locations in the current version, and/or whether the types of exceptions are more or less serious than the previous version(s). The generated reports may be used as evidence to assess the quality of the application in a manner that does not show favoritism. For example, the exception-based reports may provide an objective view of the application's quality, which may contain the exact call sequence and code line location, thereby providing an objective story of code quality by exposing the errors in the application.

According to one embodiment, the apparatus may include the capabilities of generating a score value that may represent the quality of the application's code based on the collected exceptions and their corresponding exception information. In one particular example, the score value may be computed based on the total number of exceptions, the number of unique locations producing exceptions, and/or the types of exceptions, as well as any other criteria as discussed herein. In a further example, the score value may start at a certain value (e.g., 800), and then a penalty value (e.g., 150) may be applied to this value when the exception information meets a certain criteria such as the total number of exceptions being over a threshold value (e.g., 100). Then, the final computed score value (e.g., 650) may be presented to the application developer as a measure of the code quality of the application as a way to review the developer's work product. These and other features of the embodiments are further described with reference to the figures.

FIG. 1 illustrates an apparatus 100 for measuring code quality using exceptions according to an embodiment. Portions of the apparatus 100 may be implemented on an application server, or generally, with any type of computing device capable of executing applications such as application 110. The application 110 may include application code 118 operating on an operating system of the application server/computing device that provides the code for the application 110. The application 110 may be virtually any type of software application. In one example, the application 110 may include internet-based web applications in the areas of banking, retail and/or any other type of business area. Also, the application 110 may be a Java-based application or a .Net-based application.

The apparatus 100 may include at least one processor 106, and a non-transitory computer readable medium 108. The at least one processor 106 may include one or more processors associated with the apparatus 100 that are used carry out the functionalities/operations of the apparatus 100. The non-transitory computer readable medium 108 may be any type of storage medium capable of storing instructions. The stored instructions, when executed by the at least one processor 106, may cause the at least one processor 106 to perform the functionalities/operations of the components of the apparatus 100 as discussed herein.

The apparatus 100 may include a simulator 102 configured to simulate typical transactions when the application 110 is deployed in a runtime situation. For example, the simulator 102 may simulate transactions with the application 110 according to a transaction script 104. The transaction script 104 may include instructions that allow the simulator 102 to simulate desired transactions with the application 110. The simulator 102 may include any type of known scripting tool that can generate specific requests to a target application such as the application 110. In more detail, during runtime of the application 110 according to the transaction script 104, the application 110 may receive a server request that starts or prompts the execution of the application code 118 according to a call chain initiated by the server request. The server requests may be in the form of general Hypertext Transfer Protocol (HTTP) posts, Java Message Service (JMS) messaging, or Representational State Transfer (REST)/Remote Procedure Calls (RPC) based web service requests, and are, generally, the entry points into the application 110. In one example, the server request may be a login to a banking transaction, for example.

However, before simulation of the application 110 is carried out using the simulator 102, an instrumentation engine 124 may inject instrumentation code 116 into the application 110 such that any exceptions 120 produced by the application 110 according to the transaction script 104 may be collected. For example, the instrumentation engine 124 may be configured to inject the instrumentation code 116 within a base class 112 of the application 110 such that constructors 114 of the base class 112 are monitored/intercepted during runtime of the application 110. In one implementation, the base class 112 may include java.lang.throwable class, as further described below.

Generally, instrumentation may refer to the concept of monitoring specific components in a system in order to measure the level of an application's performance, to diagnose errors and/or to write trace information. For example, instrumentation code may be injected into selected locations in an application to monitor the desired methods/operations of the application. The injected instrumentation code is executed when the instrumented methods of the application is called in order to collect any type of information specified by the instrumentation code. In other words, instrumentation of a particular application component may permit the monitoring and collection of any type of information that an instrumented component utilizes such as its arguments, metrics, and/or properties that occur within the call chain initiated by the server request.

Referring to FIG. 1, when an error occurs in the application code 118, the application 110 may generate an exception 120, which contains information about the error, including its type and the state of the application 110, as well as a snap shot of the call tree (also referred to as a stack trace). Creating an exception 120, and handing it to the runtime system may be referred to as throwing an exception 120. For example, an exception 120 may be considered a signal that is generated within a particular thread, which is a part of a method that defines the process of the application 110. In one specific example, the application 110 may receive a number of requests from a number of different users, and one of these threads may include an access request to a database or file. However, if the file is missing, an exception 120 may be generated or thrown. For example, the runtime platform executing the application 110 may generate the exception 120, or a developer may have inserted customized code that would generate the exception 120.

Each exception 120 may represent a potential error in the application code 118 such as Class Not Found Exception, Undeclared Throwable Exception, Invocation Target Exception, etc. There may be hundreds of different types of exceptions 120. More generally, the exception 120 may be a problem that arises during execution of the application 110 for many different reasons such as the user entered invalid, a file that needs to be opened cannot be found, or a network connection cannot be established. Also, the exceptions 120 may occur as a result of an unplanned code fault that results in altering the code path. Further, the exceptions 120 may include core Java exceptions and custom exceptions added by developers. However, generally, the exceptions 120 may encompass any kind or type of exception capable of being generated in the application 110.

According to another aspect, the exceptions 120 may include checked exceptions and unchecked exceptions. Checked exceptions may include exceptions that have been anticipated by the developer. For example, when code is developed, the developer can anticipate a checked exception, and insert a try-catch block around the code. The try-catch block may include instructions for handling the checked exception. In other words, there are various methods in an application that must include a try-catch block in order to have the application code compile. In one example, a method call may indicate to open a file. However, the application containing this method call will not compile unless the method call includes a try-catch block in order to catch the exception in the event that the file cannot be located. Unchecked exceptions are generally runtime exceptions that are produced by the application 110 in the event an unforeseen (or should have foreseen) error occurs in the application 110.

In any type of process defined by the application code 118, during runtime of the application 110, the application 110 may receive an initial server request, which prompts a first method call. The first method call may invoke a second method call, which invokes a third method call, and so forth. At some point, within the method call sequence, the application 110 may generate an exception 120. Then, the application 110 may traverse the method call sequence in order to determine if any of the methods' classes include the try-catch block. When the application 110 has traversed the entire method call sequence, and has not located the try-catch block, the thread will terminate. This type of exception may be referred to an uncaught exception (e.g., unchecked, uncaught exception). For example, an uncaught exception may refer to an exception 120 that was generated by the application 110, but the application 110 does not include code that handles the exception 120. If an uncaught exception was generated on the main thread of the process (e.g., the initial thread), the application 110 will terminate.

Conventionally, only caught exceptions may be logged in a log file. For instance, the insertion of the try-catch block may catch exceptions 120, and then optionally provide instructions to log them in the log file. Although there may be mechanisms that handle generated exceptions, the developer may not have included instructions to log them. Therefore, the identifying and logging of caught exceptions according to conventional methods are left to the discretion of the application developer. However, the apparatus 100 of FIG. 1 may log every exception 120 (e.g., checked, unchecked, caught, or uncaught) thrown in the application 110.

Regardless of the type of exception 120, for every exception 120 that is generated or thrown in the application code 118, the base class 112 is invoked. For example, in the context of Java-based applications, the base class 112 may include the java.lang.throwable class, which is the superclass of all errors and exceptions in the Java language. This base class 112 is one of the first classes loaded in the Java runtime environment. Objects that are instances of this class (or one of its subclasses) are thrown by the JAVA machine or by a throw statement. Also, it has been recognized that because the base class 112 (e.g., the java.lang.throwable class) may be adjusted (e.g., using a redefiner retransform of a class), the base class 112 may be instrumented, as further described below.

The base class 112 may represent a central point in the application 110 which receives every exception 120 generated in the application 110. For example, any part of the application 110 (e.g., the Java Core classes, third party classes, or application-specific classes) eventually invokes the base class 112 when the exception 120 is generated. As such, the base class 112 may be considered the central point in the application 110 that eventually receives every exception 120 generated in the application 110. According to the embodiments, as explained below, the injected instrumentation code 116 may be configured to instrument the base class 112 such that the apparatus 100 can collect and log every generated exception 120 along with their corresponding exception information 122.

For example, the instrumentation engine 124 may be configured to inject the instrumentation code 116 into the base class 112 such that all possible constructors 114 of the base class 112 are monitored/intercepted during runtime of the application 110. A constructor in a class may be considered a type of subroutine (or method) called to create an object, which, in this case, creates the exception objects (referred to as exceptions 120). In one example, the base class 112 may have one or more possible constructors 114. In further detail, the base class 112 associated with the exceptions 120 may include the following constructors 114: Throwable (String Message) that constructs a new throwable with specified detailed message; Throwable (String Message, Throwable Cause) that constructs a new throwable with the specified detail message and cause; and Throwable (Cause) that constructs a new throwable with the specified cause and a detail message having the class the detail message of the cause.

The instrumentation code 116 may be included within an instrumentation file on the instrumentation engine 124. The instrumentation file may also be referred to as a recording file, rules file, or a points file. The instrumentation engine 124 may be configured to locate the appropriate location in the application 110 (e.g., the base class 112) according to the instrumentation code 116 specified in the instrumentation file, inject the instrumentation code 116 in at least one of the entries and exits of one or more associated constructors 114 of the base class 112 when the application 110 is loaded. For example, when the application 110 is loaded, the instrumentation engine 124 may review every class associated with the application 110, and if the instrumentation code 116 applies to the loaded class, the instrumentation engine 124 may instrument the specified constructors 114 by inserting the instrumentation code 116 into the entries and/or exits of the specified constructors 114.

A runtime collector 126 may monitor the constructors 114 during runtime of the call chain, which may include the capture/collection of parameters (e.g., the exception information 122) related to the specified constructors 114. The instrumentation code 116 itself provides, in part, the logic for performing one or more data collection processes such as the capturing of the exception information 122 as well as potentially altering the flow of the application 110. In more detail, the runtime collector 126 may be configured to intercept the exceptions 120 generated by the application 110, and collect exception information 122 for each exception 120, during runtime of the application 110, based on the instrumentation code 116 included within the application 110. For example, when an instrumented constructor 114 is called during execution of the transaction script 104, the runtime collector 126 executes the injected instrumentation code 116 by collecting the information provided to the invoked constructor 114 (e.g., at the entry) and/or the information produced by the invoked constructor 114 (e.g., at the exit), as further explained below.

The runtime collector 126 may be configured to monitor the constructors 114 of the base class 112, and collect one or more arguments of the monitored constructor 114 as the monitored constructor 114 is called during runtime of the application 110. For example, as the application 110 is executing the transaction script 104, the application code 118 may generate the exceptions 120, which eventually invoke the base class 112 of the application 110. Depending on the type of exception 120, at least one of the constructors 114 may create an exception 120. By virtue of the injected instrumentation code 116 within the base class 112, the runtime collector 126 may collected the generated exceptions 120 and the exception information 122. For instance, using the injected instrumentation code 116, the runtime collector 126 may collect the arguments provided to the constructors 114, which may provide detailed information regarding each exception 120 such as the exception information 122. Again, every exception 120 generated in the application 110 eventually invokes the base class 112, which constructs the exception 120 using one or more of the constructors 114. As such, by monitoring/intercepting the base class 112 via the injected instrumentation code 116, the runtime collector 126 may collect every exception 120 generated in the application 110.

The exception information 122 may include a fault line number indicating at least one code line in the application code 118 that produced a corresponding exception 120, class information indicating a class that produced the corresponding exception 120, type information indicating a type of the corresponding exception 120, a stack trace of the application 110 that produced the corresponding exception 120, a cause of the corresponding exception 120, and a message associated with the corresponding exception 120. The stack trace may provide the location within the application code 118 that produced the exceptions 120. In other words, the stack trace may include a report of active stack frames at a certain point in time during the execution of the application 110.

A collection module 128 may be configured to receive and store the intercepted exceptions 120 and the exception information 122 in a memory unit 130. In one example, the memory unit 130 may be a hash array. As the application 110 is being executed according to the transaction script 104, the collection module 128 may log each intercepted exception 120 and its corresponding execution information 122 in the memory unit 130 for further processing by an exception analyzer 132.

According to one embodiment, the exception analyzer 132 may be configured to analyze the intercepted exceptions 120 and the corresponding exception information 122 stored in the memory unit 130. For instance, after the transaction script 104 is completed, the exception analyzer 132 may analyze the collected exception information 122. Then, a report generator 140 may be configured to generate at least one exception-based report based on the analysis, where the at least one exception-based report provides an indication of code quality of the application 110. The exception-based report may provide the intercepted exceptions 120 and at least a portion of the exception information 122 in a manner that exposes the code quality of the application 110. As further explained below, the exception-based report may characterize the exceptions 120 by exception type, location, or any other type of attribute associated with the exceptions 120. Also, the exception-based report may provide a total number of intercepted exceptions 120, as well as the number of exceptions 120 within each exception type and the number of unique locations within the application 110 producing the exceptions 120.

The apparatus 100 may include a display 142 that provides the exception-based report to the user. Also, the display 142 may provide a selection of runtime parameters 144 used to generate the exception-based reports. The runtime parameters 144 may include an option that allows a user to change the frequency of the generated report, an option that allows a user to enable the logging of all exceptions 120 (or certain types), as well as any other parameter associated with the simulation of the application 110, the collection of the exceptions 120/exception information 122, and the subsequent report generation.

Also, according to one embodiment, the transaction script 104 may include instructions to simulate certain transactions with the application 110 over a period of time such as two hours, for example. A person may use the simulator 102 to assess the quality of a version of the application 110, and then receive an exception-based report. Then, if a subsequent version of the application 110 is produced, the simulator 102 may simulate the subsequent version using the same transaction script 104 (e.g., the same transactions are executed over the same period of time), thereby obtaining a new exception-based report. Upon a comparison of the exception-based report for the previous version of the application 110, and the exception-based report for the current version of the application 110, the improvement (or regression) of the application 110 may be determined. For example, upon a comparison of the exception-based reports, it may be determined whether the exception count is increasing or decreasing between the previous version of the application 110 and the current version of the application 110, whether there are new exception types and/or new locations in the current version, and/or whether the types of exceptions are more or less serious than the previous version.

The display 142 may provide any type of exception-based report generated by the report generator 140. However, as explained later in the disclosure, the display 142 may provide an exception type report 146 that categorizes the exceptions 120 by type, and an exception location report 148 that categorizes the exceptions 120 by location. The exception type report 146, and the exception location report 148 are specific types of reports, where the embodiments encompass any type of reports that provides an arrangement of at least some of the intercepted exceptions 120 and at least a portion of the exception information 122.

Further, the display 142 may provide a score value 150 that indicates an overall code quality of the application 110. For example, the score value 150 may represent a value that provides an indication of the code quality of the application 110 based on the stored exception information 122. As further described below, the score value 150 may be computed based on the total number of exceptions 120, the number of unique locations producing the exceptions 120, and/or the types of exceptions 120, as well as other criteria associated with the exceptions 120. Also, it is noted that the reports generated by the report generator 140, and the calculated score value 150 does not necessarily have to be provided to the display 142, but rather this information may be stored within one or more files associated with the apparatus 100, and then transmitted to any interested party.

Referring to FIG. 1, the exception analyzer 132 may include a categorizer 134 that is configured to derive the type of each exception 120, and a location within the application code 118 that produced each exception 120 based on the exception information 122 stored in the memory unit 130. For example, as indicated above, the memory unit 130 may store the type of exception 120 for each exception 120 generated during runtime of the application 110. The categorizer 134 may use the type information to classify the generated exceptions 120 according to the type. Then, the report generator 140 may generate the exception type report 146 that classifies the intercepted exceptions 120 by the type. The exception type report 146 may be provided to the display 142, or stored within a file associated with the apparatus 100. The exception type report 146 is illustrated in FIG. 3, and explained later in the disclosure. Also, the categorizer 134 may use at least one of the fault line number, class information, and the stack trace, in order to derive the location within the application code 118 that produced each exception 120. Then, the report generator 140 may generate the exception location report 148 that classifies the intercepted exceptions 120 according to the derived locations. The exception location report 148 may be provided to the display 142, or stored in a file associated with the apparatus 100. The exception location report 148 is illustrated in FIG. 4, and explained later in the disclosure.

Also, the categorizer 134 may categorize the intercepted exceptions 120 according to any other criteria (e.g., other the location and type) using the exception information 122, or any information derived by the exception analyzer 132. For instance, the categorizer 134 may categorize the intercepted exceptions 120 according to the class or method that produced the exception 120, or various time periods that produced the exceptions 120, for example.

In general, the exception analyzer 132 may analyze the intercepted exceptions 120 based on the collected exception information 122 to obtain a wide variety of information. In one example, the exception analyzer 132 may derive an exception type count indicating a number of times a particular type of exception 120 was generated, a class exception count indicating a number of times a particular class or method produced an exception 120, and/or a faulting location count indicating a number of times a particular location produced an exception 120, based on the exception information 122. Then, the report generator 140 may generate the exception-based report based on the exception type count, the class exception count, and/or the faulting location count.

Further, the exception analyzer 132 may be configured to derive class information indicating the class that produced the corresponding exception 120, method information indicating the method that produced the corresponding exception 120, caught information indicating whether or not the corresponding exception 120 was caught, file information indicating the file that produced the corresponding exception 120, time information indicating a time when the corresponding exception 120 was generated, and/or message information indicating the message associated with the corresponding exception 120. Then, the report generator 140 may generate the exception-based report based on the class information, the method information, the caught information, the file information, the time information, and/or the message information. With respect to the caught information, the cause and/or the message of the exception information 122 may reveal if the application developer has accounted for the exception 120, e.g., by including the try-catch block into the application code 118. Uncaught exceptions may be considered more serious than caught exceptions.

Further, the exception analyzer 132 may include an application grader 136 that may be configured to generate the score value 150 representing a code quality of the application 110 based on the exception information 122. The score value 150 may be any type of numerical or alphabetical value indicating a level or grade of the application 110. For instance, the score value 150 may represent an overall code quality of the application 110 using the exception information 122. In one embodiment, the application grader 136 may generate the score value 150 based on the total number of exceptions 120, the type of exceptions 120, the number of uncaught exceptions 120, the number of unique locations that produced the exceptions 120, and/or any other type of information obtained from the exception information 122. For example, the application grader 136 may generate the score value 150 according to a weighting algorithm that applies weights (or penalty values) to values associated with the exception information 122.

In further detail, if the total number of exceptions 120 is above a threshold level, the application grader 136 may determine the associated penalty value, and then apply that penalty value to a score by deducting the penalty value from the score. Similarly, if the number of uncaught exceptions 120 exceeds a certain threshold value, the application grader 136 may determine the associated penalty value, and then apply that penalty value to the score by deducting the penalty value from the score. Similar reasoning may be applied to any other information obtained from the exception information 122 or derived by the exception analyzer 132 such as the number of unique locations producing the exceptions 120, for example. However, generally, the embodiments encompass any type of algorithm that computes the score value 150 from the exception information 122 and/or the information derived by the exception analyzer 132.

Also, it is note that some types of exceptions 120 are more serious than other types of exceptions 120. Therefore, the exception analyzer 132 may include a ranking unit 138 that ranks the type of exceptions 120 according to severity. For example, a first type of exception 120 may be considered more serious than a second type of exception 120. The ranking unit 138 may assign a ranking value to each type of exception 120, and the application grader 136 may generate the score value 150 based on the ranked types by adjusting the score value 150 using the ranking values. The report generator 140 may provide the score value 150 on the display 142 associated with the apparatus 100, or store the score value 150 in a file associated with the apparatus 100. Also, the score value 150 may be provided within any of the generated exception-based reports such as the exception type report 146, and the exception location report 148, for example. The score value 150 may be presented to the application developer as a measure of the code quality of the application 110 as a way to review the developer's work product.

Therefore, based on the exception-based reports and/or the score value 150, the quality of the application 110 may be assessed. For example, the total number of exceptions 120 may indicate the disruptiveness of the exceptions 120 in the application 110, e.g., if the application 110 is constantly in an interrupt mode. Also, the seriousness of the exceptions 120 may be exposed by the identification of the types of exceptions 120 and the number of exceptions 120 included within each type. Also, the stack trace of the exceptions 120 may indicate whether there are any threads terminated by the exceptions 120, and whether the exceptions 120 are located in a location under control of the developer or in a location under the control of a third party.

Also, the exception-based reports and/or the score value 150 may provide a mechanism to baseline between versions or releases of the application 110. In this context, the report generator 140 may also include a comparison module that compares the results of the transaction script 104 for a version of the application 110, and the results of the transaction script 104 for one or more other versions of the application 110, and then generate an exception-based report that provides the results of the comparison. For example, the comparison report may indicate if the exception count is increasing or decreasing between a previous version of the application 110 and a current version of the application 110, whether there are new exception types and/or new locations in the current version, and/or whether the types of exceptions 120 are more or less serious than the previous version.

Figure 2:
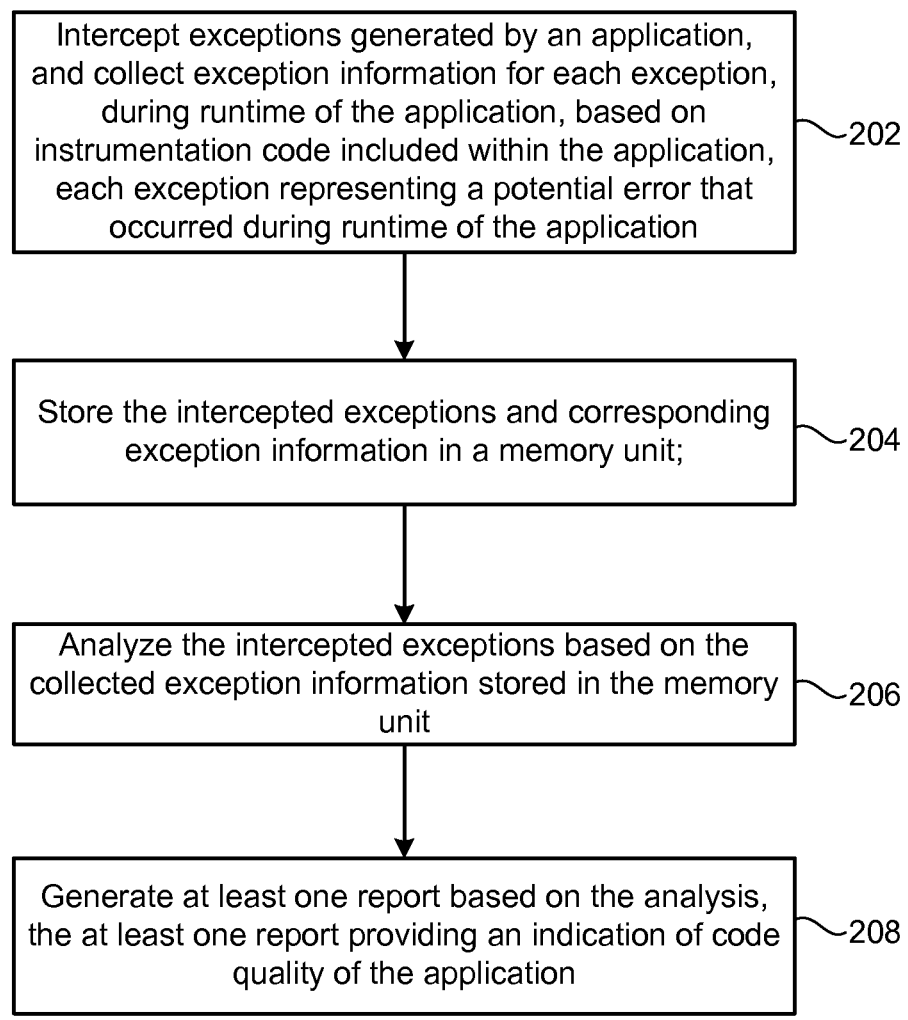
FIG. 2 is a flowchart illustrating example operations of the apparatus of FIG. 1 according to an embodiment.

FIG. 2 is a flowchart illustrating example operations of the apparatus of FIG. 1 according to an embodiment. Although FIG. 2 is illustrated as a sequential, ordered listing of operations, it will be appreciated that some or all of the operations may occur in a different order, or in parallel, or iteratively, or may overlap in time.

Exceptions generated by an application may be intercepted, and exception information may be collected for each exception, during runtime of the application, based on instrumentation code included within the application, where each exception represents a potential error that occurred during runtime of the application (202). For example, the runtime collector 126 may be configured to intercept exceptions 120 generated by the application 110, and collect exception information 122 for each exception 120, during runtime of the application 110, based on instrumentation code 116 included within the application 110, where each exception 120 represents a potential error that occurred during runtime of the application 110.

For example, the instrumentation engine 124 may be configured to inject the instrumentation code 116 into the base class 112 associated with the exceptions 120 such that constructors 114 of the base class 112 are monitored during runtime of the application 110. The base class 112 may represent a central point in the application 110 which receives every exception 120 generated in the application 110. Any part of the application 110 (e.g., the Java Core classes, third party classes, or application-specific classes) eventually invokes the base class 112 when an exception 120 is generated. As such, the base class 112 may be considered the central point in the application 110 that eventually receives every exception 120 generated in the application 110. In one implementation, the base class 112 associated with the exceptions 120 may include java.lang.throwable class. When the application 110 is loaded, the instrumentation engine 124 may be configured to locate the base class 112, and inject the instrumentation code 116 in at least one of the constructors 114. For example, when the application 110 is loaded, the instrumentation engine 124 may review every class associated with the application 110, and if the instrumentation code 116 applies to the loaded class, the instrumentation engine 124 may instrument the constructors 114 by inserting the instrumentation code 116 into the entries and/or exits of the constructors 114.

The runtime collector 126 may be configured to monitor the constructors 114 of the base class 112, and collect one or more arguments of a monitored constructor 114 as the monitored constructor 114 is called during runtime of the application 110. For example, as the application 110 is executing the transaction script 104, the application code 118 may generate the exceptions 120, which eventually invoke the base class 112 of the application 110. Depending on the type of exception 120, at least one of the constructors 114 may create an exception 120. By virtue of the injected instrumentation code 116 within the base class 112, the runtime collector 126 may collected the generated exceptions 120 and the exception information 122. For instance, using the injected instrumentation code 116, the runtime collector 126 may collect the arguments provided to the constructors 114, which may include detailed information regarding each exception 120 such as the exception information 122 explained above. Again, every exception 120 generated in the application 110 eventually invokes the base class 112, which constructs the exception 120 using one or more of the constructors 114. As such, by monitoring/intercepting the base class 112 via the injected instrumentation code 116, the runtime collector 126 may collect every exception 120 generated in the application 110.

The intercepted exceptions and the corresponding exception information may be stored in a memory unit (204). For example, the collection module 128 may be configured to receive and store the intercepted exceptions 120 and the exception information 122 in the memory unit 130. In one example, the memory unit 130 may be a hash array. As the application 110 is being executed according to the transaction script 104, the collection module 128 may log each intercepted exception 120 and its corresponding execution information 122 in the memory unit 130.

The intercepted exceptions may be analysed based on the collected exception information stored in the memory unit (206). For example, the exception analyzer 132 may be configured to analyze the intercepted exceptions 120 and the corresponding exception information 122 stored in the memory unit 130 after the transaction script 104 is completed. The exception analyzer 132 may analyze the intercepted exceptions 120 based on the collected exception information 122 to obtain a wide variety of information. In one example, the exception analyzer 132 may derive an exception type count indicating a number of times a particular type of exception 120 was generated, a class exception count indicating a number of times a particular class or method produced an exception 120, and/or a faulting location count indicating a number of times a particular location produced an exception 120, based on the exception information 122.

At least one report may be generated based on the analysis, where the at least one report may provide an indication of code quality of the application (208). For example, the report generator 140 may be configured to generate at least one exception-based report based on the analysis, where the at least one exception-based report provides an indication of code quality of the application 110. The exception-based report may provide the intercepted exceptions 120 and at least a portion of the exception information 122 in a manner that exposes the code quality of the application 110. The exception-based report may characterize the exceptions 120 by exception type, location, or any other criteria of the stored exception information 122. Also, the exception-based report may provide a total number of intercepted exceptions 120, as well as the number of exceptions 120 within each exception type and the number of unique locations of the application producing the exceptions 120.

FIG. 3 illustrates the exception type report 146 according to an embodiment. The exception type report 146 may classify the exceptions 120 according to their type. The exception type report 146 may include a plurality of fields such as exception type field 302, unique locations field 304, times thrown field 306, timing fields indicating a first time 308 and a last time 310, last class field 312, last method field 314, last file field 316, last uncaught field 318, last message field 320, and/or last stack trace field 322.

For example, the exception type 302 may list each type of exception 120 generated during the runtime of the application 110. In the example of FIG. 3, the exception type report 146 provides a first exception type 302-1 and a second exception type 302-2. Although two exception types 302 are illustrated in FIG. 3, the exception type report 146 may include many other exception types, depending on how many was generated by the application 110, and then collected by the runtime collector 126.

The first exception type 302-1 provides the name of the corresponding exception type—java.lang.runtime.exception. The second exception type 302-2 provides the name of the corresponding exception type—java.lang.NullPointer.Exception. For each of these exception types 302, the exception type report 146 may provide detailed information based on the exception information 122 and/or the exception analyzer 132 such as information 304-322.

For each exception type 302, the unique locations field 304 may provide a unique location number indicating a number of unique locations that produced the type of exception 120. In the example of FIG. 3, for each of first exception type 302-1 and the second exception type 302-2, the number of unique locations is 1.

For each exception type 302, the times thrown field 306 may provide the number of times the application 110 has generated the corresponding exception type 302, and the timing fields may indicate the first time 308 that the corresponding exception type 302 was generated, and the last time 310 that the corresponding exception type 302 was generated. For example, the first time 308 provides timing information specifying the date and/or time that the first exception of the corresponding exception type 302 was generated, and the last time 310 provides timing information specifying the date and/or time that the last exception of the corresponding exception type 302 was generated.

For each exception type 302, the last class field 312 may identify the class for the last exception that was generated within the corresponding exception type 302, the last file field 316 may identify the file for the last exception that was generated within the corresponding exception type 302, the last uncaught field 318 may specify whether the last exception of the corresponding exception type 302 was uncaught, the last message field 320 may specify the message for the last exception of the corresponding exception type 302, and the last stack trace field 322 may specify the stack trace for the last exception of the corresponding exception type 302.

FIG. 4 illustrates the exception location report 148 according to an embodiment. The exception location report 148 may classify the exceptions 120 according to their location, e.g., as provided by the stack trace. The exception location report 148 may include a plurality of fields such as class field 402, method field 404, file field 406, uncaught field 408, exception name field 410, times thrown field 412, timing fields indicating a first time 414 and a last time 416, message field 418, and/or stack trace field 420.

In the example of FIG. 4, the exception location report 148 classifies the exceptions 120 according to their location, which may be derived from the location identified by the stack trace field 420. However, the exception location report 148 may classify the exceptions 120 according to any other fields that may indicate a location such as the corresponding methods or files, for example. It is noted that the exception location report 148 only illustrates a portion of the full report, which may include many other exception locations. For example, if a user would scroll through the exception location report 148, the user would be able to view other exception locations.

In more detail, within each unique location, the class field 402 may specify the class for the corresponding exception 120, the method field 404 may specify the method that produced the corresponding exception 120, the file field 406 may specify the file that produced the corresponding exception 120, the uncaught field 408 may specify whether the corresponding exception 120 was uncaught, and the exception name field 410 may specify the name of the type of the corresponding exception 120. Also, the times thrown field 412 may provide the number of times the application 110 has generated exceptions 120 within that unique location, and the timing fields may indicate the first time 414 that an exception 120 was generated within that location, and the last time 416 that the an exception 120 was generated within that location. Further, the message field 418 may provide the message of the corresponding exception 120, and the stack trace field 420 may provide the code lines in the application 110 that generated the corresponding exceptions 120.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art.

What is claimed is:

1. A method for measuring code quality using exceptions, the method comprising:
   intercepting, by at least one processor, exceptions generated by an application, and collecting, by the at least one processor, exception information for each exception, during runtime of the application, based on instrumentation code included within the application, each exception representing a potential error that occurred during runtime of the application, the exceptions including caught exceptions and uncaught exceptions;
   storing, by the at least one processor, the intercepted exceptions and corresponding exception information in a memory unit;
   analyzing, by the at least one processor, the intercepted exceptions based on the collected exception information stored in the memory unit including determining a total number of intercepted exceptions, a number of uncaught exceptions, and a number of unique locations that produced the exceptions;
   calculating, by the at least one processor, a score indicating a level of code quality of the application with a weighted scoring algorithm inputted with the total number of intercepted exceptions, the number of uncaught exceptions, and the number of unique locations that produced the exceptions, wherein the calculating the score with the weighted scoring algorithm includes applying weights to values of the collected exception information; and generating, by the at least one processor, an exception-based report providing the score, and a listing of the exceptions by type, the listing of the exceptions also indicating whether or not an exception was uncaught and number of times each exception type was thrown.

2. The method of claim 1, further comprising:
injecting, by the at least one processor, the instrumentation code within a base class associated with the exceptions;
monitoring, by the at least one processor, all constructors of the base class; and
collecting, by the at least one processor, one or more arguments of a monitored constructor as the monitored constructor is called during the runtime of the application.

3. The method of claim 1, wherein the exception information includes a fault line number indicating at least one code line that produced a corresponding exception, class information indicating a class that produced the corresponding exception, type information indicating a type of the corresponding exception, a stack trace of the application that produced the corresponding exception, a cause of the corresponding exception, and a message associated with the corresponding exception.

4. The method of claim 1, further comprising:
generating, by the at least one processor, an exception-based report that characterizes the exceptions by locations within the application that produced each exception.

5. An apparatus for measuring code quality using exceptions, the apparatus comprising:
at least one processor;
a non-transitory computer-readable storage medium including instructions executable by the at least one processor, the instructions configured to implement,
a runtime collector configured to intercept exceptions generated by an application, and collect exception information for each exception, during runtime of the application, based on instrumentation code included within the application, each exception representing a potential error that occurred during runtime of the application, the exceptions including caught exception and uncaught exceptions;
a collection module configured to store the intercepted exceptions and corresponding exception information in a memory unit;
an exception analyzer configured to analyze the intercepted exceptions based on the collected exception information stored in the memory unit including determining a total number of intercepted exceptions, a number of caught or uncaught exceptions, and a number of unique locations that produced the exceptions;
the exception analyzer configured to calculate a score indicating a level of code quality of the application based on the total number of intercepted exceptions, the number of caught or uncaught exceptions, and the number of unique locations that produced the exceptions, wherein the exception analyzer is configured to calculate the score according to a weighted scoring algorithm that applies weights to values of the collected exception information; and
a report generator configured to provide the score and generate an exception-based report based on the analysis, the exception-based report providing an indication of code quality of the application, the exception-based report listing the exceptions by type.

6. The apparatus of claim 5, further comprising:
an instrumentation engine configured to inject the instrumentation code within a base class associated with the exceptions such that constructors of the base class are monitored during runtime of the application.

7. The apparatus of claim 6, wherein the base class associated with the exceptions includes java.lang.throwable class.

8. The apparatus of claim 6, wherein the runtime collector is further configured to monitor the constructors of the base class, and collect one or more arguments of a monitored constructor as the monitored constructor is called during the runtime of the application.

9. The apparatus of claim 5, wherein the exception information includes a fault line number indicating at least one code line that produced a corresponding exception, class information indicating a class that produced the corresponding exception, type information indicating a type of the corresponding exception, a stack trace of the application that produced the corresponding exception, a cause of the corresponding exception, and a message associated with the corresponding exception.

10. The apparatus of claim 5, wherein the exception analyzer includes:
a categorizer configured to derive a type of each exception, and a location within the application that produced each exception based on the exception information,
the categorizer configured to categorize the intercepted exceptions according to the type.

11. The apparatus of claim 5,
wherein the exception analyzer is further configured to derive an exception type count indicating a number of times each exception type was thrown, a class exception count indicating a number of times a particular class or method produced an exception, and a faulting location count indicating a number of times a particular location produced an exception, based on the exception information,
wherein the report generator is further configured to provide the exception type count, the class exception count, and the faulting location count.

12. The apparatus of claim 5, wherein the exception analyzer is configured to calculate the score according to the weighted scoring algorithm that applies the weights to total number of exceptions, different exception types, the number of uncaught exceptions, and the number of unique locations that produced the exceptions.

13. The apparatus of claim 5, wherein the exception analyzer is configured to assign a ranking value to each exception type, and the exception analyzer is configured to adjust the score using the ranking values.

14. The apparatus of claim 5, wherein the memory unit is a hash array.

15. A non-transitory computer-readable medium storing instructions that when executed cause at least one processor to measure code quality using exceptions, the instructions comprising instructions to:
intercept exceptions generated by an application, and collect exception information for each exception, during runtime of the application, based on instrumentation code included within the application, each exception representing a potential error that occurred during runtime of the application, the exceptions including caught exceptions and uncaught exceptions, the uncaught exceptions being exceptions not caught in a try/catch block;
store the intercepted exceptions and corresponding exception information in a memory unit;

analyze the intercepted exceptions based on the collected exception information stored in the memory unit including determine a total number of intercepted exceptions and a number of uncaught exceptions;

calculate a score indicating a level of code quality of the application based on a weighted scoring algorithm inputted with the total number of intercepted exceptions and the number of uncaught exceptions such that weights are applied to the exception information;

generate an exception-based report based on the analysis;

compare the exception-based report and the score with an exception-based report and score for a previous version of the application; and provide a comparison report indicating whether the level of code quality has increased or decreased from the previous version of the application.

16. The non-transitory computer-readable medium of claim 15, wherein the instructions include instructions to determine if an exception count is increasing or decreasing between a current version and the previous version, and whether there are new exception types and new locations in the current version.

17. The non-transitory computer-readable medium of claim 15, wherein the exception-based report provides a portion of a stack trace of an exception, the portion of the stack trace indicating whether there are any threads terminated by the exception and whether the exception is located in a location under control of a developer of the application.

18. The non-transitory computer-readable medium of claim 15, wherein the instructions to calculate the score include instructions to:

determine a first penalty value when the total number of exceptions is above a first threshold level;

determine a second penalty value when the number of uncaught exceptions is above a second threshold level; and adjust the score based on the first penalty value and the second penalty value.

19. The non-transitory computer-readable medium of claim 18, wherein the instructions to calculate the score include instructions to:

calculate the score with the weighted scoring algorithm including applying the weights to the total number of exceptions, different types of exceptions, the number of uncaught exceptions, and number of unique locations that produced the exceptions.

* * * * *

UNITED STATES PATENT AND TRADEMARK OFFICE
CERTIFICATE OF CORRECTION

| | |
|---|---|
| PATENT NO. | : 9,052,980 B2 |
| APPLICATION NO. | : 13/772040 |
| DATED | : June 9, 2015 |
| INVENTOR(S) | : Walter T. Hulick, Jr. |

Page 1 of 1

It is certified that error appears in the above-identified patent and that said Letters Patent is hereby corrected as shown below:

Claims

In column 18, line 43, in claim 12, delete "to" and insert -- to the --, therefor.

Signed and Sealed this
Twelfth Day of April, 2016

Michelle K. Lee
*Director of the United States Patent and Trademark Office*